United States Patent
Goel et al.

(10) Patent No.: US 9,467,963 B2
(45) Date of Patent: Oct. 11, 2016

(54) SYSTEMS AND METHODS FOR OBTAINING SYSTEM INFORMATION FOR A WIRELESS COMMUNICATION DEVICE

(71) Applicant: QUALCOMM Incorporated, San Diego, CA (US)

(72) Inventors: Neha Goel, Franborough (GB); Nitin Sachdeva, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 13/974,236

(22) Filed: Aug. 23, 2013

(65) Prior Publication Data

US 2015/0056988 A1    Feb. 26, 2015

(51) Int. Cl.
*H04W 68/00* (2009.01)
*H04W 4/00* (2009.01)
*H04W 60/00* (2009.01)
*H04W 68/02* (2009.01)
*H04W 88/06* (2009.01)

(52) U.S. Cl.
CPC .......... *H04W 60/005* (2013.01); *H04W 68/02* (2013.01); *H04W 88/06* (2013.01); *Y02B 60/50* (2013.01)

(58) Field of Classification Search
CPC .. H04W 68/02; H04W 68/005; H04W 68/00
USPC ................................. 455/458, 434
See application file for complete search history.

(56) References Cited

U.S. PATENT DOCUMENTS

| 7,684,357 B2 | 3/2010 | Jokinen et. al. | |
| 2005/0048982 A1* | 3/2005 | Roland | H04W 48/16 455/449 |
| 2012/0149361 A1* | 6/2012 | Esch | H04W 48/12 455/422.1 |

FOREIGN PATENT DOCUMENTS

| WO | 2011017803 A1 | 2/2011 |
| WO | 2013014000 A1 | 1/2013 |

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 8) 3GPP TS 44.060 V8.8.0, 2010, 591pgs.
(Continued)

*Primary Examiner* — Omoniyi Obayanju
(74) *Attorney, Agent, or Firm* — Austin Rapp & Hardman

(57) ABSTRACT

Devices, systems, articles of manufacture, and methods for obtaining system information for a wireless communication device are described. According to some embodiments, a subscription supported by the wireless communication device enters a paging reorganization mode. The wireless communication device acquires a portion of system information by a first subscription using a radio frequency (RF) resource. The subscription changes a paging mode of the wireless communication device. The subscription releases the RF resource after acquiring the portion of the system information and prior to acquiring all of the system information. Other aspects, embodiments, and features are also claimed and described.

41 Claims, 10 Drawing Sheets

(56) References Cited

OTHER PUBLICATIONS

3GPP TS 44.018: "3rd Generation Partnership Project; Technical Specification Group GSM/EDGE Radio Access Network; Mobile radio Access Network; Mobile radio interface layer 3 specification; Radio Resource Control (RRC) protocol," Version 8.10.0, Release Mar. 8, 2010, pp. 425.

International Search Report and Written Opinion—PCT/US2014/051834—ISA/EPO—Dec. 23, 2014.

* cited by examiner

SYSTEMS AND METHODS FOR OBTAINING SYSTEM INFORMATION FOR A WIRELESS COMMUNICATION DEVICE

TECHNICAL FIELD

The technology discussed below relates generally to communication systems, and more specifically, to systems and methods for obtaining system information on a wireless communication device.

BACKGROUND

Wireless communication systems have become an important means by which many people worldwide have come to communicate. A wireless communication system may provide communication for a number of mobile devices, each of which may be serviced by a base station.

Within wireless communications systems, base stations may periodically send data, such as voice data, user data, and/or control data to mobile devices residing in wireless networks. In some instances, a mobile device may receive multiple sets of data, sometimes from multiple base stations in the same wireless communication system. For example, a mobile device may maintain multiple subscriptions at the same time. Benefits may be realized by improving how mobile devices maintain multiple subscriptions.

SUMMARY OF SOME EXAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for obtaining system information for a wireless communication device is described. The method includes entering a paging reorganization mode after at least one of cell reselection and ending a voice call. The method also includes acquiring a portion of system information by a first subscription using a radio frequency (RF) resource. The method also includes changing a paging mode of the wireless communication device. The method also includes releasing the RF resource after acquiring the portion of the system information and prior to acquiring all of the system information.

The first subscription may exclusively use the RF resource during the paging reorganization mode. The first subscription may read and decode all paging blocks during the paging reorganization mode. The paging reorganization mode may be a non-discontinuous reception (non-DRX) mode.

The portion of system information may include system information type 3 (SI 3) or system information type 4 (SI 4). The portion of system information may include at least one of a cell selection parameter, a random access channel (RACH) parameter, a control channel parameter, a cell identifier, a location area identifier, paging block information and cell block information.

The wireless communication device may include multiple subscriptions. Releasing the RF resource may include releasing the RF resource for use by a second subscription.

The method may also include determining a paging group to which the wireless communication device belongs. The method may also include reading and decoding paging blocks that are associated with the wireless communication device's paging group, and avoiding reading and decoding paging blocks that are not associated with the wireless communication device's paging group.

Changing the paging mode may include receiving a paging mode indication via a paging block associated with the wireless communication device, and changing the paging mode based on the paging mode indication. The paging mode indication may be received via at least one of an immediate assignment message or a paging message.

The method may also include acquiring other system information when the RF resource is available. The system information may be acquired from at least one of a paging channel (PCH) and a broadcast control channel (BCCH).

An apparatus for obtaining system information for a wireless communication device is also described. The apparatus includes a processor and memory in electronic communication with the processor. The apparatus also includes instructions stored in the memory. The instructions are executable to enter a paging reorganization mode after at least one of cell reselection and ending a voice call. The instructions are also executable to acquire a portion of system information by a first subscription using a radio frequency (RF) resource. The instructions are also executable to change a paging mode of the wireless communication device. The instructions are also executable to release the RF resource after acquiring the portion of the system information and prior to acquiring all of the system information.

A computer-program product for obtaining system information for a wireless communication device is also described. The computer-program product includes a non-transitory computer-readable medium having instructions thereon. The instructions include code for causing a first subscription to enter a paging reorganization mode after at least one of cell reselection and ending a voice call. The instructions also include code for causing the first subscription to acquire a portion of system information by a first subscription using a radio frequency (RF) resource. The instructions also include code for causing the first subscription to change a paging mode of the wireless communication device. The instructions also include code for causing the first subscription to release the RF resource after acquiring the portion of the system information and prior to acquiring all of the system information.

An apparatus for obtaining system information for a wireless communication device is also described. The apparatus includes means for entering a paging reorganization mode after at least one of cell reselection and ending a voice call. The apparatus also includes means for acquiring a portion of system information using a radio frequency (RF) resource. The apparatus also includes means for changing a paging mode of the wireless communication device. The apparatus also includes means for releasing the RF resource after acquiring the portion of the system information and prior to acquiring all of the system information.

Still yet other embodiments can include an apparatus for obtaining system information for a wireless communication device. Such an apparatus can include means for entering a paging reorganization mode after at least one of cell reselection and ending a voice call; means for acquiring a portion of system information using a radio frequency (RF) resource; means for changing a paging mode of the wireless communication device; and means for releasing the RF resource after acquiring the portion of the system information and prior to acquiring all of the system information. These means are described in portions of the specification below and are found in the appended drawings. The functions carried out by the components discussed below represent the features capable of carrying out the means discussed in this application.

Other means-type embodiments can have additional features. For example, the means for acquiring a portion of system information can exclusively use the RF resource during the paging reorganization mode. As another example, the means for acquiring a portion of system information can read and decode all paging blocks during the paging reorganization mode. A portion of system information can includes at least one of system information type 3 (SI 3) and system information type 4 (SI 4). In some embodiments, a wireless communication device can includes multiple subscriptions. As another feature example, means for determining a paging group can be configured to determine a paging group for which the wireless communication device belongs. Means-type embodiments can also include means for reading and decoding paging blocks that are associated with the wireless communication device's paging group; and means for avoiding reading and decoding paging blocks that are not associated with the wireless communication device's paging group. Also, the means for changing the paging mode comprises: means for receiving a paging mode indication via a paging block associated with the wireless communication device; and means for changing the paging mode based on the paging mode indication. And in some embodiments, means-type embodiments can include means for acquiring other system information when the RF resource is available.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

After a cell re-selection procedure or a call release, a wireless communication device may change its paging mode to a paging reorganization mode. Paging reorganization may be employed when a wireless communication device does not have system information, cell suitability information, and/or control channel information for decoding a paging channel. In a paging reorganization mode, the wireless communication device may acquire all system information necessary to establish communications with a base station.

While a paging reorganization mode may allow the wireless communication device to acquire all system information at a faster rate, it may decrease wireless communication efficiency. For example, in the paging reorganization mode, the wireless communication device may decode all paging blocks, regardless of its paging group. This decoding can lead to increased power consumption. Also, in the paging reorganization mode, a first subscription of the wireless communication device may exclusively use a radio frequency (RF) resource until it decodes all the system information, calculates its paging group and decodes the paging blocks. This may lead to degraded wireless communication device page performance as other subscriptions may not have access to the RF resource during this period.

Accordingly, the technology described herein may reduce power consumption and improve wireless communication device performance. Some wireless communication devices may use multiple subscriber identity module (SIM) cards to communicate via multiple subscriptions. After a cell re-selection procedure or a call release, a wireless communication device may change its paging mode to a paging reorganization mode. While in the paging reorganization mode, a first subscription of the wireless communication device may acquire system information type 3 (SI 3) or system information type 4 (SI 4). After acquiring SI 3 or SI 4, the wireless communication device may move out of the paging reorganization mode and release the RF resource to be used by multiple subscriptions. The wireless communication device may then acquire the rest of the system information intermittently, when the RF resource is available.

Changing a paging mode after acquiring SI 3 may reduce the amount of time that the first subscription exclusively uses the RF resource which may improve mobile terminal performance. Changing the paging mode may also reduce power consumption as the wireless communication device may not need to read and decode all the paging blocks in a paging channel, but rather just the paging blocks that are associated with the wireless communication device's paging group.

Figure 1:
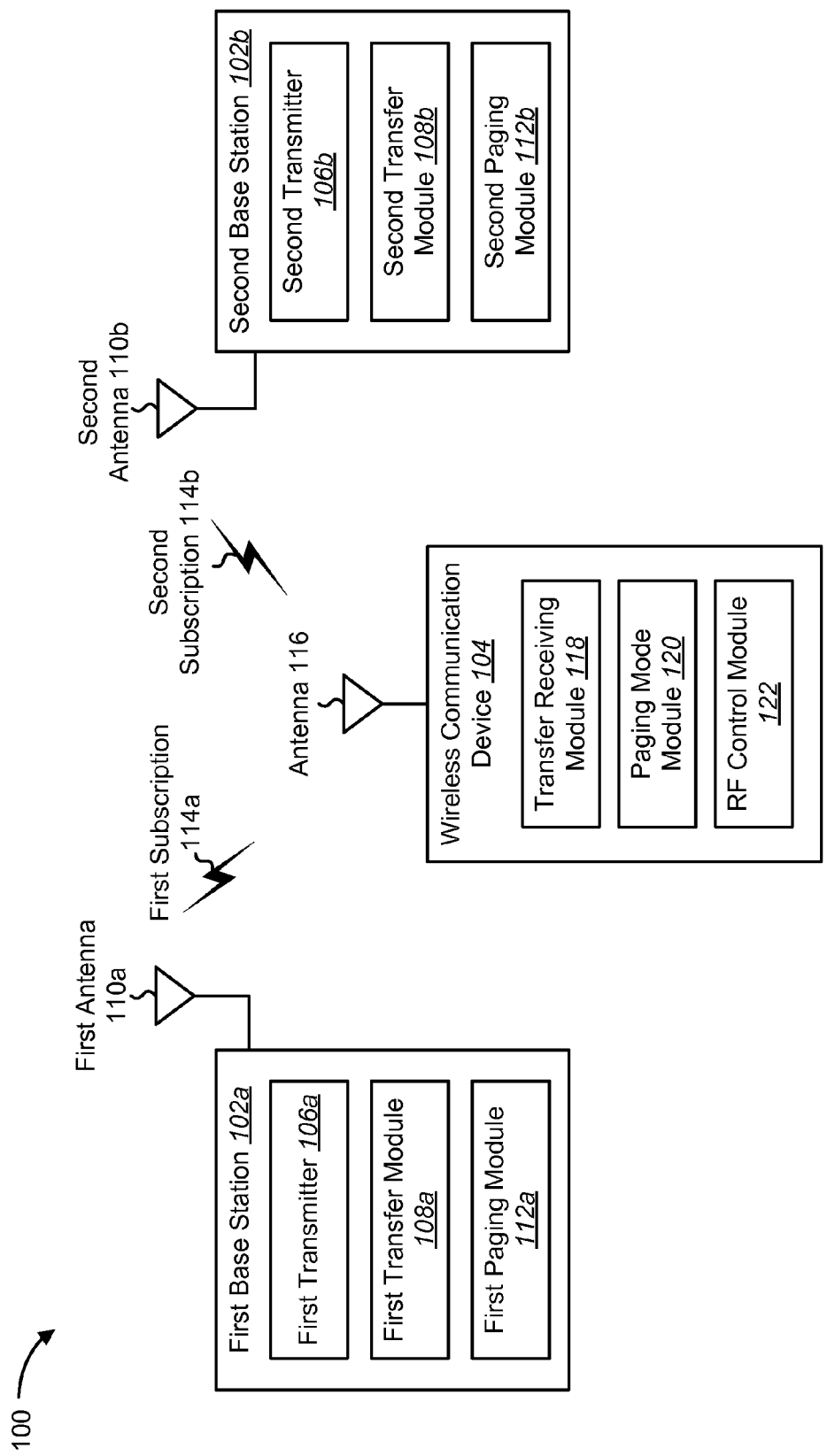
FIG. 1 shows an example of a wireless communication system in which the systems and methods disclosed herein may be utilized.

FIG. 1 shows an example of a wireless communication system 100 in which the systems and methods disclosed herein may be utilized. The wireless communication system 100 may include a first base station 102a, a second base station 102b, and a wireless communication device 104.

As used herein, the term "base station" may refer to a wireless communication station that is used to communicate with the wireless communication device 104. A base station 102 may alternatively be referred to as an access point (including nano-, pico- and femto-cells), a Node B, an evolved Node B (eNodeB), a Home Node B, or some other similar terminology.

The first base station 102a may include a first transmitter 106a, a first transfer module 108a, a first paging module 112a, and a first antenna 110a. The first transmitter 106a may process and prepare voice, data, and other signals to be sent from the first base station 102a to the wireless communication device 104. The first transfer module 108a may send data, such as voice data and/or user data to the wireless communication device 104. For example, the first transfer module 108a may send voice data via the first transmitter 106a and the first antenna 110a. The data may be sent to the wireless communication device 104 as a first subscription 114a.

The first paging module 112a may generate and send out page messages to the wireless communication device 104. For example, a page message may be sent to the wireless communication device 104 via the first transmitter 106a and the first antenna 110a. The page message may be sent to the wireless communication device 104 via the first subscription 114a. The wireless communication system 100 uses page messages to broadcast paging information to one or more wireless communication devices 104. For example, a page message may be sent to the wireless communication device 104 to alert the wireless communication device 104 of an incoming voice call on the first subscription 114a.

The second base station 102b may include a second transmitter 106b, a second transfer module 108b, a second paging module 112b and a second antenna 110b that may be similar to corresponding elements described in connection with the first base station 102a. The second base station 102b may send data to the wireless communication device 104 as a second subscription 114b.

As used herein, the term "wireless communication device" refers to an electronic device that may be used for voice and/or data communication over a wireless communication system 100. Examples of wireless communication devices 104 may include access terminals, client devices, client stations, etc., and may wirelessly communicate with other communication devices (e.g., base stations 102 and other wireless communication devices 104). Some wireless communication devices 104 may be referred to as stations (STAs), mobile devices, mobile stations (MSs), subscriber stations, user equipments (UEs), remote stations, access terminals, mobile terminals, terminals, user terminals, subscriber units, etc. Additional examples of wireless communication devices 104 include laptop or desktop computers, cellular phones, smart phones, wireless modems, e-readers, tablet devices, gaming systems, entertainment devices, routers, televisions, educational devices, display boards, etc.

The wireless communication device 104 may include a transfer receiving module 118, a paging mode module 120, a radio frequency (RF) control module 122, and at least one antenna 116. The wireless communication device 104 may transmit and receive communications from the first base station 102a and the second base station 102b via the antenna 116. For example, the wireless communication device 104 may receive communications from the first base station 102a and/or receive communications from the second base station 102b.

As depicted in FIG. 1, the wireless communication device 104 may be configured to communicate via multiple subscriptions 114. The first subscription 114a may correspond to the first base station 102a. The first subscription 114a may transfer data, such as voice data and/or user data, between the first base station 102a and the wireless communication device 104. Similarly, the second subscription 114b may correspond to the second base station 102b. The second subscription 114b may transfer data, such as voice data and/or user data, between the second base station 102b and the wireless communication device 104. The wireless communication device 104 may employ multiple subscriber identity module (SIM) cards to communicate with the multiple subscriptions 114. For example, the wireless communication device 104 may employ a first SIM card that communicates with the first subscription 114a and a second SIM card that communicates with the second subscription 114b. Additional SIM cards may also be employed in other configurations.

Receiving/transmitting information using a subscription 114 may include exclusively using an RF resource available to the wireless communication device 104. For example, the wireless communication device 104 may employ a single RF resource (e.g., transmitter and receiver). Accordingly, the wireless communication device 104 may only receive/transmit data via one subscription 114 at a time. During this time, other subscriptions may be idle. For example, the wireless communication device 104 may exclusively use an RF resource to receive voice data via the first subscription 114a. In this example, the wireless communication device 104 may not send or receive data via the second subscription 114b while it is receiving voice data via the first subscription 114a. Similarly, the wireless communication device 104 may exclusively use an RF resource to receive voice data via the second subscription 114b, so that it does not send or receive via the first subscription 114a while it is receiving voice data via the second subscription 114b. In these examples, the wireless communication device 104 may switch from the first subscription 114a to the second subscription 114b and vice-versa such that both subscriptions 114 may have exclusive access to the RF resource at different times.

While FIG. 1 depicts a wireless communication device 104 that is configured to communicate via multiple subscriptions 114, the systems and methods described herein may also be performed by a wireless communication device 104 that is configured to communicate with a single subscription or more subscriptions 114. In other words, the systems and methods described herein may be performed by a wireless communication device 104 that has a single SIM card or multiple SIM cards.

The transfer receiving module 118 may process data (e.g., voice data and/or user data) received at the wireless communication device 104. For example, the transfer receiving module 118 may be employed when the wireless communication device 104 is tuned to communicate with the first subscription 114a or the second subscription 114b. Receiving and processing data may include decoding received data.

One example of data that the transfer receiving module 118 may receive is system information. System information may be information that allows the wireless communication device 104 to camp on a cell. As used herein, the term "cell" may refer to a base station 102 and/or its coverage area, depending on the context in which the term is used. Camping on a cell may mean that the wireless communication device 104 monitors the cell for different types of information. This information can include system information and paging information, for example. System information may be categorized into types of system information. For example, a portion of the system information may be system information type 3 (SI 3). SI 3 may include one or more of a cell selection parameter, a random access channel (RACH) parameter, a control channel parameter, a cell identifier, a location area identifier, and information for calculating the wireless communication device 104 paging block. In another example, system information type 4 (SI 4) may include the information included in SI 3 and a cell block identifier. More detail regarding system information types is given in connection with FIG. 4.

In some modes of operation, the transfer receiving module 118 may receive all the system information at once. For example, while being tuned to the first subscription 114a, the wireless communication device 104 may be in a paging reorganization mode until it receives and decodes all the system information (e.g., all the system information types). A specific example of a wireless communication device 104 in the paging reorganization mode is given as follows. When a multi-SIM wireless communication device 104 with a single RF resource (e.g., a single RF transmit and receive chain) is in the paging reorganization mode, the first subscription 114a may use the RF resource, and may not release the RF resource until all the system information is received and the wireless communication device 104 changes its paging mode. In other words, the second subscription 114b may be denied RF resources for a period of time (from 3-10 seconds, for example). This may lead to degraded performance for the wireless communication device 104. For example, the second subscription 114b may miss pages until the RF resource is released, and cell selection may be triggered on the second subscription 114b.

In another mode of operation, the transfer receiving module 118 may read and decode one or more portions of the system information intermittently when an RF resource is available. For example, in this other mode of operation, the transfer receiving module 118 may read and decode the system information for the first subscription 114a when the RF resource is not being used by the second subscription 114b.

In one example, the transfer receiving module 118 may receive the system information using both modes of operation described above. An example is given as follows. During a paging reorganization mode, the wireless communication device 104 may read and decode SI 3 for the first subscription 114a. Then, after acquiring SI 3, the wireless communication device 104 may switch to a paging mode indicated by a network. The paging mode indicated by the network may allow intermittent use of the RF resource by both subscriptions 114. Accordingly, the transfer receiving module 118 may read and decode other system information for the first subscription 114a and may demodulate pages from the second base station 102b via the second subscription 114b.

The paging mode module 120 may switch the paging mode of the wireless communication device 104. For example, after a cell re-selection or a call release, the paging mode module 120 may switch the wireless communication device 104 into a paging reorganization mode. The paging reorganization mode may be a non-discontinuous reception (non-DRX) mode. In other words, in the paging reorganization mode, the wireless communication device 104 may continually scan for paging messages, without any gaps in scanning. The paging mode module 120 may also switch the paging mode of the wireless communication device 104 to another paging mode. For example, after acquiring a portion of the system information (e.g., SI 3) in a paging reorganization mode, the paging mode module 120 may switch the paging mode of the wireless communication device 104. While in the other paging mode, the wireless communication device 104 may intermittently receive other system information.

Additionally, while in the other paging mode, the wireless communication device 104 may be configured to not read and decode all paging blocks. Rather, the wireless communication device 104 may be configured to read and decode paging blocks that are associated with paging group to which the wireless communication device 104 belongs and to avoid reading and decoding other paging blocks that are not associated with the wireless communication device's 104 paging group. For example, after acquiring SI 3, the wireless communication device 104 may determine its paging group and listen to paging blocks associated with that paging group. More detail regarding paging groups is given in connection with FIG. 3.

In some configurations, the paging mode module 120 may switch the paging mode of the wireless communication device 104 based on received input. For example, the wireless communication device 104 may receive a paging mode indication from a network (e.g., from a base station 102). The paging mode indication may indicate a paging mode to be used while communicating with a particular base station 102. Accordingly, the paging mode module 120 may change the wireless communication device's 104 paging mode to the paging mode indicated. The paging mode indication may be included in an immediate assignment message or a paging message included in a paging block associated with the wireless communication device's 104 paging group.

Switching the paging mode of the wireless communication device 104 from the paging reorganization mode to another paging mode may be beneficial. This is because it allows other subscriptions 114 to use the RF resource. For example, while in the other paging mode, the second subscription 114b may use the RF resource to demodulate a page from the second base station 102b. Switching to another paging mode may also be beneficial because the wireless communication device 104 may only have to decode a portion of the paging blocks, rather than reading all paging blocks regardless of the wireless communication device's 104 paging group.

A more specific example of the benefits of switching the paging mode after acquiring only a portion of the system information is given as follows. Using existing methods, during a paging reorganization mode, the first subscription 114a may hold an RF resource while acquiring all system information. This may last approximately 3-5 seconds in good radio conditions, and up to approximately 10 seconds in bad radio conditions. Accordingly, the second subscription 114b may be without the RF resource for approximately 3-10 seconds. By comparison, using technology disclosed herein, the wireless communication device 104 may acquire SI 3 in approximately 400 milliseconds (ms) in good radio conditions while in a paging reorganization mode. Accordingly, the second subscription 114b may be without the RF resource for approximately 400 ms. Therefore, switching from a paging reorganization mode to another paging mode after acquiring SI 3 may result in approximately a 80-90% increase in efficiency with regard to missed pages. Table (1) illustrates the increase in MT performance using the systems and methods described herein. The information included in Table (1) represents data gathered from field tests of the systems and methods described herein.

TABLE (1)

| DRX cycle for second sub. | Existing method: Duration first sub. was in page reorg mode until all SI acquired | Number of pages missed on the second sub. based on current method | New Method: Duration first sub. was in page reorg mode until SI 3 or SI 4 acquired | Number of pages missed on the second sub. based on the new method | % improvement |
| --- | --- | --- | --- | --- | --- |
| 470 ms | 3 seconds | 6 | 400 ms | 1 | 83% |
| 470 ms | 4 second | 8 | 450 ms | 1 | 87% |
| 470 ms | 5 seconds | 10 | 520 ms | 1 | 90% |

The RF control module 122 may control access to the RF resource. For example, the first subscription 114a may have exclusive access to the RF resource while in a paging reorganization mode. In another example, multiple subscriptions 114 may have intermittent access to the RF resource. For example, during a normal paging mode, the first subscription 114a and the second subscription 114b may intermittently access the RF resource. The RF control module 112 may release the RF resource. For example, after the first subscription 114a has acquired a portion of the system information, the RF control module 112 may release the RF resource to be used by the second subscription 114b.

Figure 2:
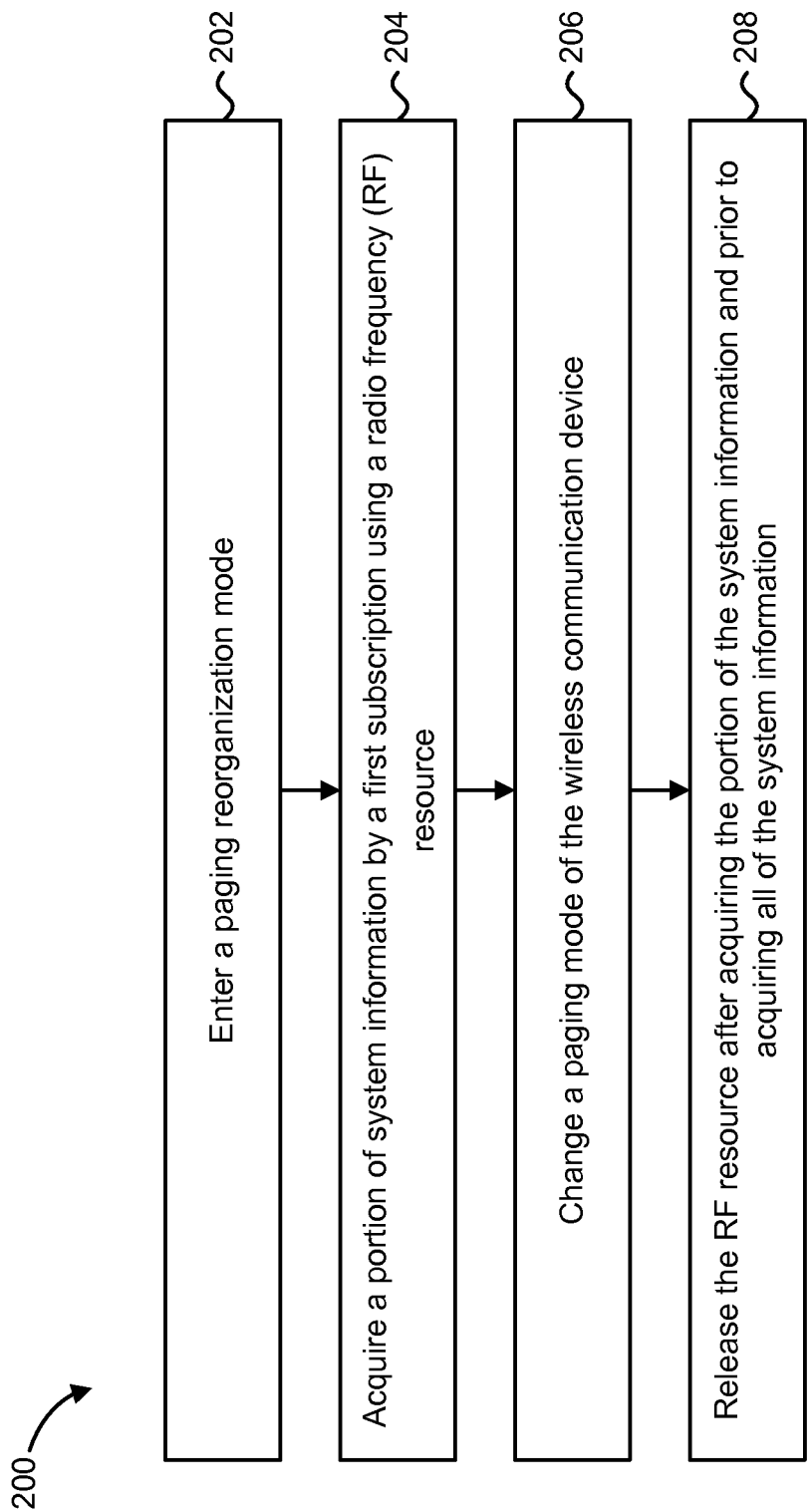
FIG. 2 is a flow diagram of a method for obtaining system information according to some embodiments of the present invention.

FIG. 2 is a flow diagram of a method 200 for obtaining system information according to some embodiments of the present invention. One or more of the steps of the method 200 may be performed by a subscription 114 that is supported by the wireless communication device 104. For example, the first subscription 114a may enter 202 a paging reorganization mode. In one example, the first subscription 114a may enter 202 the paging reorganization mode after selecting a new communication cell. In another example, the first subscription 114a may enter 202 the paging reorganization mode after ending a voice call. Entering 202 a paging reorganization mode may include changing one or more wireless communication device 104 settings to operate in the paging reorganization mode.

While in the paging reorganization mode, the wireless communication device 104 may acquire 204 a portion of system information by the first subscription 114a using an RF resource. In other words, the first subscription 114a may acquire a portion of the information that may allow the wireless communication device 104 to communicate with the first base station 102a. For example, the first subscription 114a may acquire SI 3. In another example, the first subscription 114a may acquire SI 4. The first subscription 114a may acquire 204 a portion of system information by reading and decoding paging blocks. The paging blocks may be included in a paging channel (PCH) or a broadcast channel (BCCH).

After acquiring 204 a portion of the system information, the first subscription 114a may change 206 its paging mode. For example, the first subscription 114a may switch from the paging reorganization mode to a paging mode indicated by the network. In some configurations, the paging mode indicated by the network may allow the wireless communication device 104 to share the RF resource among multiple subscriptions 114. Other channels may also be used as desired.

Accordingly, the first subscription 114a may release 208 the RF resource after acquiring the portion of the system information and prior to acquiring all of the system information. After releasing 208 the RF resource, both the first subscription 114a and the second subscription 114b may utilize the RF resource intermittently. For example, the second subscription 114b may have access to the RF resource to demodulate a page received from the second base station 102b via the second subscription 114b. During periods of time when the second subscription 114b is not transmitting/receiving data, the first subscription 114a may continue to receive other system information (e.g., SI 4, etc.).

Figure 3:
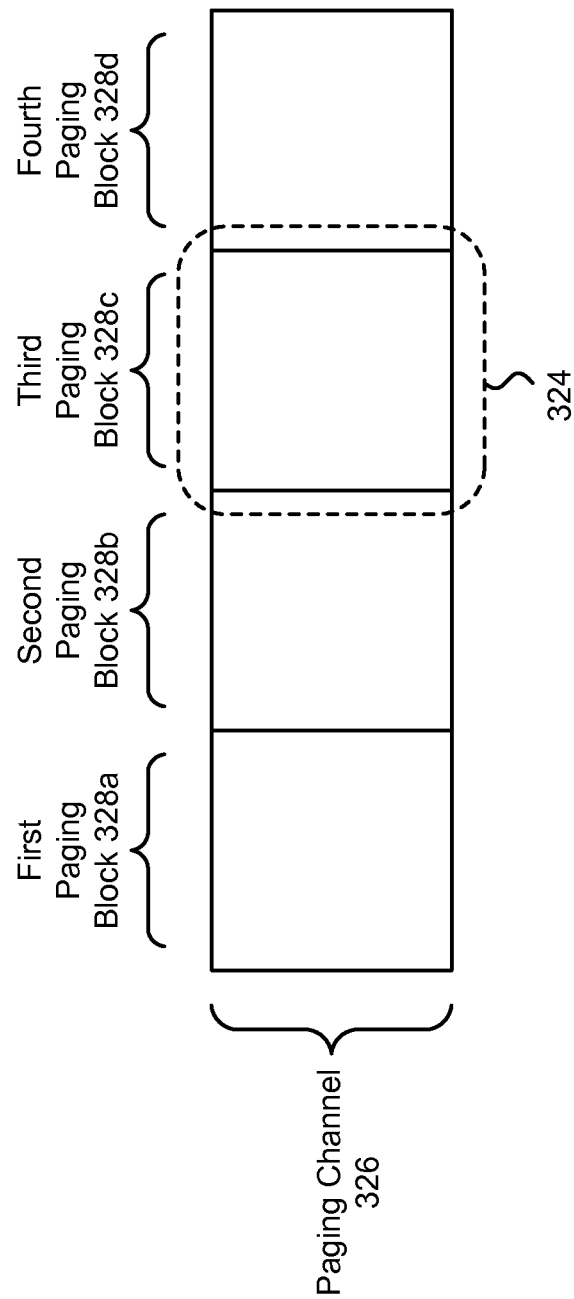
FIG. 3 is a block diagram illustrating a paging channel and multiple paging blocks according to some embodiments of the present invention.

FIG. 3 is a block diagram illustrating a paging channel 326 and multiple paging blocks 328a-d according to some embodiments of the present invention. As described above, a base station 102 may broadcast system information to one or more wireless communication devices 104. For example, system information may be sent to the wireless communication device 104 to alert the wireless communication device 104 of an incoming voice call on the first subscription 114a. The system information may also include information needed by the wireless communication device 104 to establish a communication link with a base station 102.

The base stations 102 may send the system information to the wireless communication device 104 via the paging channel (PCH) 326. While FIG. 3 depicts a paging channel 326, in some configurations, the base stations 102 may send the system information to the wireless communication device 104 using a broadcast channel (BCCH).

The paging channel 326 (or the broadcast channel) may be divided into one or more paging blocks 328a-d. For example, the paging channel 326 may be divided into a first paging block 328a, a second paging block 328b, a third paging block 328c, and a fourth paging block 328d. A paging block 328 may be a portion of the paging channel 326 that includes system information directed to one or more wireless communication devices 104. For example, the first paging block 328a may include system information for a first group of wireless communication devices 104 and the second paging block 328b may include system information for a second group of wireless communication devices 104. As used herein, the group of wireless communication devices 104 that a paging block 328 is directed to may be referred to as a paging group.

As described above, while in the paging reorganization mode, the first subscription 114a may read and decode all paging blocks 328a-d. By comparison, in another paging mode, the first subscription 114a may read and decode the paging block 328 that corresponds to the wireless communication device's 104 paging group. For example, after acquiring SI 3 and changing paging modes, the first subscription 114a may read and decode the paging block 328c that corresponds to the wireless communication device's 104 paging group, which is indicated in FIG. 3 by the box 324.

Figure 4:
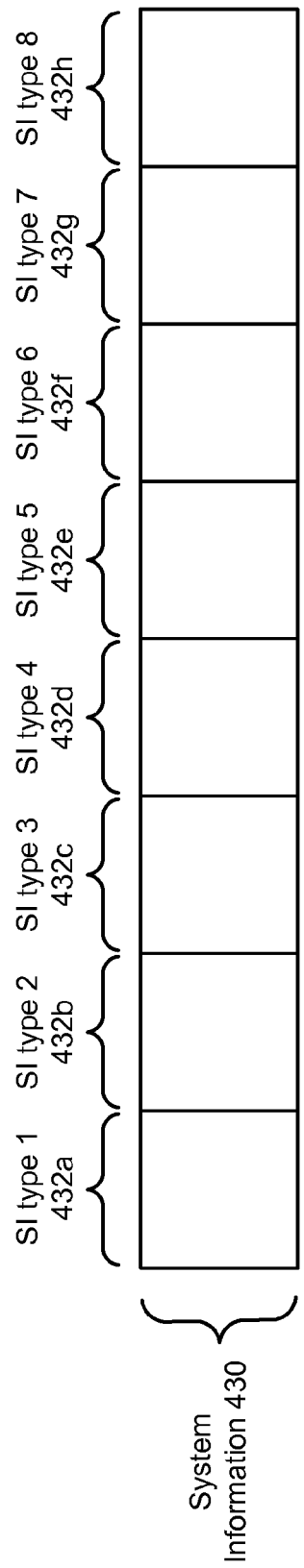
FIG. 4 is a block diagram illustrating system information and multiple system information types according to some embodiments of the present invention.

FIG. 4 is a block diagram illustrating system information 430 and multiple system information types 432 according to some embodiments of the present invention. As described above, the wireless communication device 104 may acquire system information 430 that allows the wireless communication device 104 to communicate with a base station 102. In some configurations, the system information 430 may be received via the paging blocks 328 described in connection with FIG. 3.

The system information 430 may be divided into one or more system information types 432*a-h*. The different system information types 432*a-h* may include different information that allows the wireless communication device 104 to camp on a cell. For example, SI 3 432*c* may include one or more of a cell selection parameter, a random access channel (RACH) parameter, a control channel parameter, a cell identifier, a location area identifier, and information for calculating the wireless communication device's 104 paging block. In another example, SI 4 432*d* may include information included in SI 3 432*c* and a cell block identifier. As described above, in some configurations, the wireless communication device 104 may acquire SI 3 432*c* while in a paging reorganization mode, and the other system information types 432*a-b*, *d-h* may be acquired later.

Figure 5:
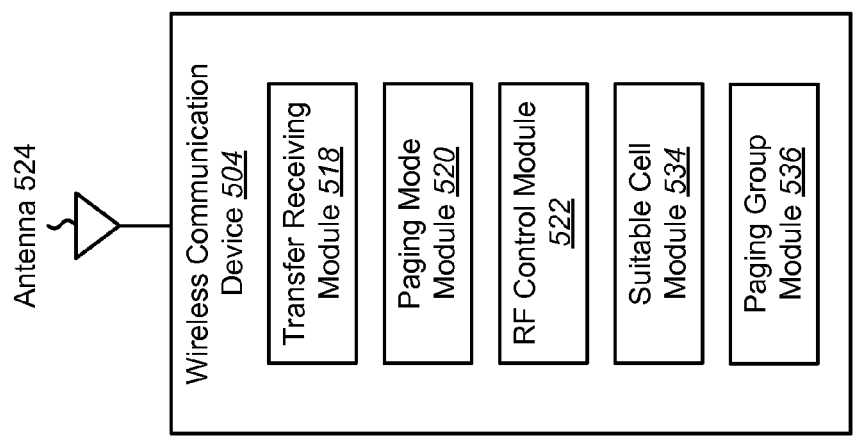
FIG. 5 shows a detailed wireless communication device in which the systems and methods disclosed herein may be utilized.

FIG. 5 shows a detailed wireless communication device 504 in which the systems and methods disclosed herein may be utilized. The wireless communication device 504 may be an example of the wireless communication device 104 described in connection with FIG. 1. The wireless communication device 504 may include a transfer receiving module 518, a paging mode module 520, an RF control module 522 and an antenna 524 that may be examples of corresponding elements described in connection with FIG. 1. The wireless communication device 504 may also include a suitable cell module 534 and a paging group module 536.

The suitable cell module 534 may determine whether a cell is suitable for communication. For example, after the wireless communication device 504 has acquired at least one of SI 3 432*c* and SI 4 432*d*, the suitable cell module 534 may detect whether the cell linking the wireless communication device 504 and the base station 102 is suitable. Determining whether a cell is suitable may include determining the strength of a signal transmitted via the cell. Determining whether a cell is suitable may also include determining whether the signal strength is greater than a certain threshold. In some implementations, the wireless communication device 504 may include lookup tables and/or metrics to determine whether the cell is suitable or not.

The paging group module 536 may determine the wireless communication device's 504 paging group. In some configurations, the paging group module 536 may determine the wireless communication device's 504 paging group based on system information. For example, SI 3 may include a paging group indication, or may include information that allows the wireless communication device 504 to determine its paging group.

As described above, in some modes of operation, the wireless communication device 504 may read and decode only those paging blocks 328 that are associated with the wireless communication device's 504 paging group. Accordingly, the paging group module 536 may determine the wireless communication device's 504 paging group and notify the wireless communication device 504 which paging blocks 328 to scan for system information.

Figure 6:
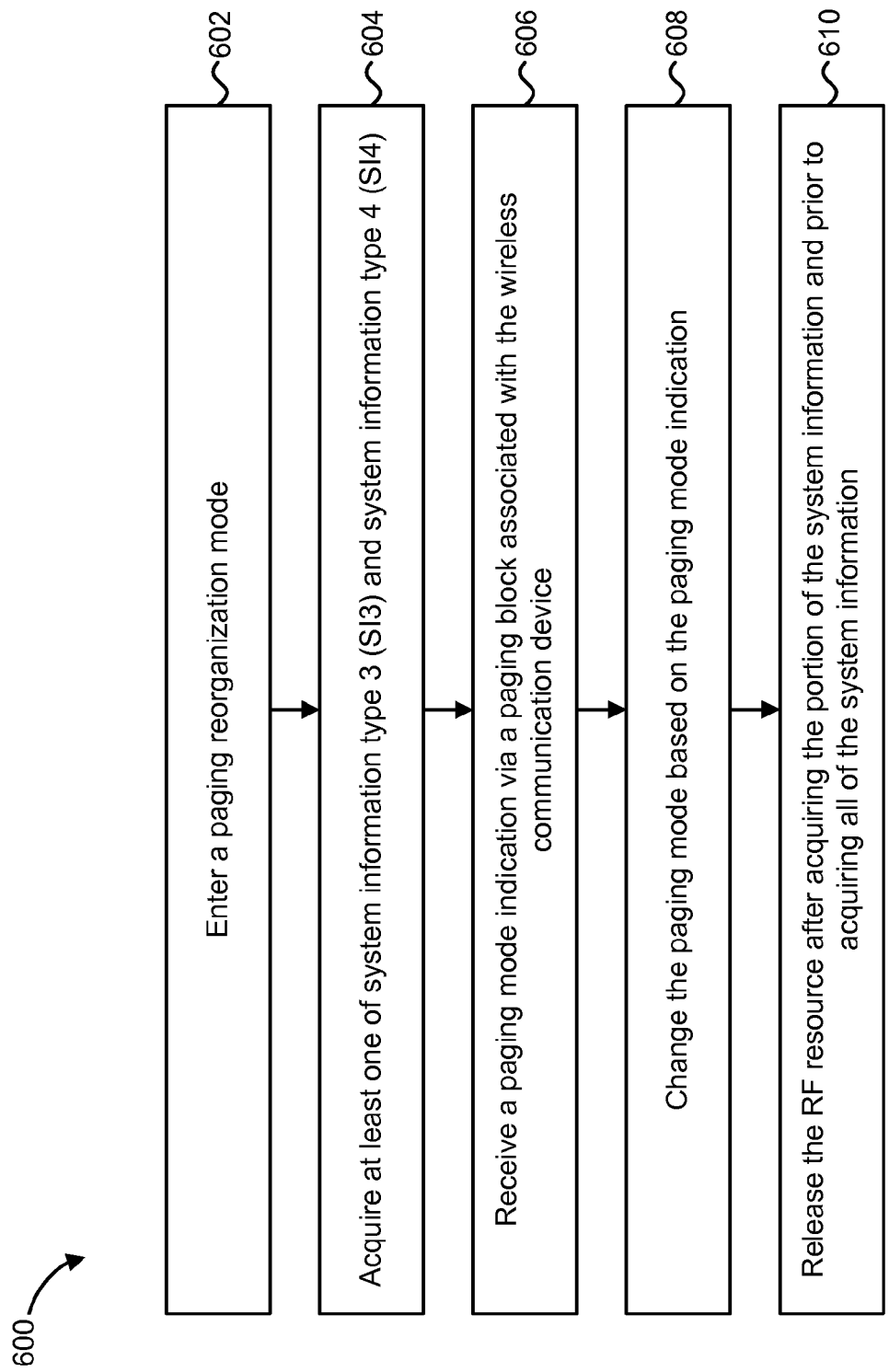
FIG. 6 is a flow diagram of a detailed method for obtaining system information according to some embodiments of the present invention.

FIG. 6 is a flow diagram of a detailed method 600 for obtaining system information 430 according to some embodiments of the present invention. One or more of the steps of the method 600 may be performed by a subscription 114 that is supported by the wireless communication device 504. For example, the first subscription 114*a* may enter 602 a paging reorganization mode. This may be performed as described in connection with FIG. 2.

While in the paging reorganization mode, the first subscription 114*a* may acquire 604 at least one of SI 3 432*c* and SI 4 432*d*. For example, the first subscription 114*a* may read and decode at least one of SI 3 432*c* and SI4 432*d* from a paging block 328 of the paging channel 326. From SI 3 432*c* and/or SI 4 432*d*, other important parameters that allow and/or enable the wireless communication device 504 to communicate with the base station 102 may be determined.

After acquiring 604 SI 3 432*c* or SI 4 432*d*, the first subscription 114*a* may change its paging mode to a paging mode indicated by the network. For example, the first subscription 114*a* may receive 606 a paging mode indication via a paging block 328 associated with the wireless communication device 504. For example, the first base station 102*a* may send a paging mode indication in a paging block 328 associated with the wireless communication device's 504 paging group. In another example, the first base station 102*a* may send the paging mode indication in an immediate assignment message that is included in a paging block 328 associated with the wireless communication device's 504 paging group.

The first subscription 114*a* may then change 608 its paging mode based on the paging mode indication. For example, if the network uses a normal paging mode, the first subscription 114*a* may change to a normal paging mode. Similarly, if the network uses an extended paging mode, the first subscription 114*a* may change to an extended paging mode.

The first subscription 114*a* may then release 610 the RF resource after acquiring the portion of system information and prior to acquiring all the system information. This may be done as described in connection with FIG. 2.

Figure 7:
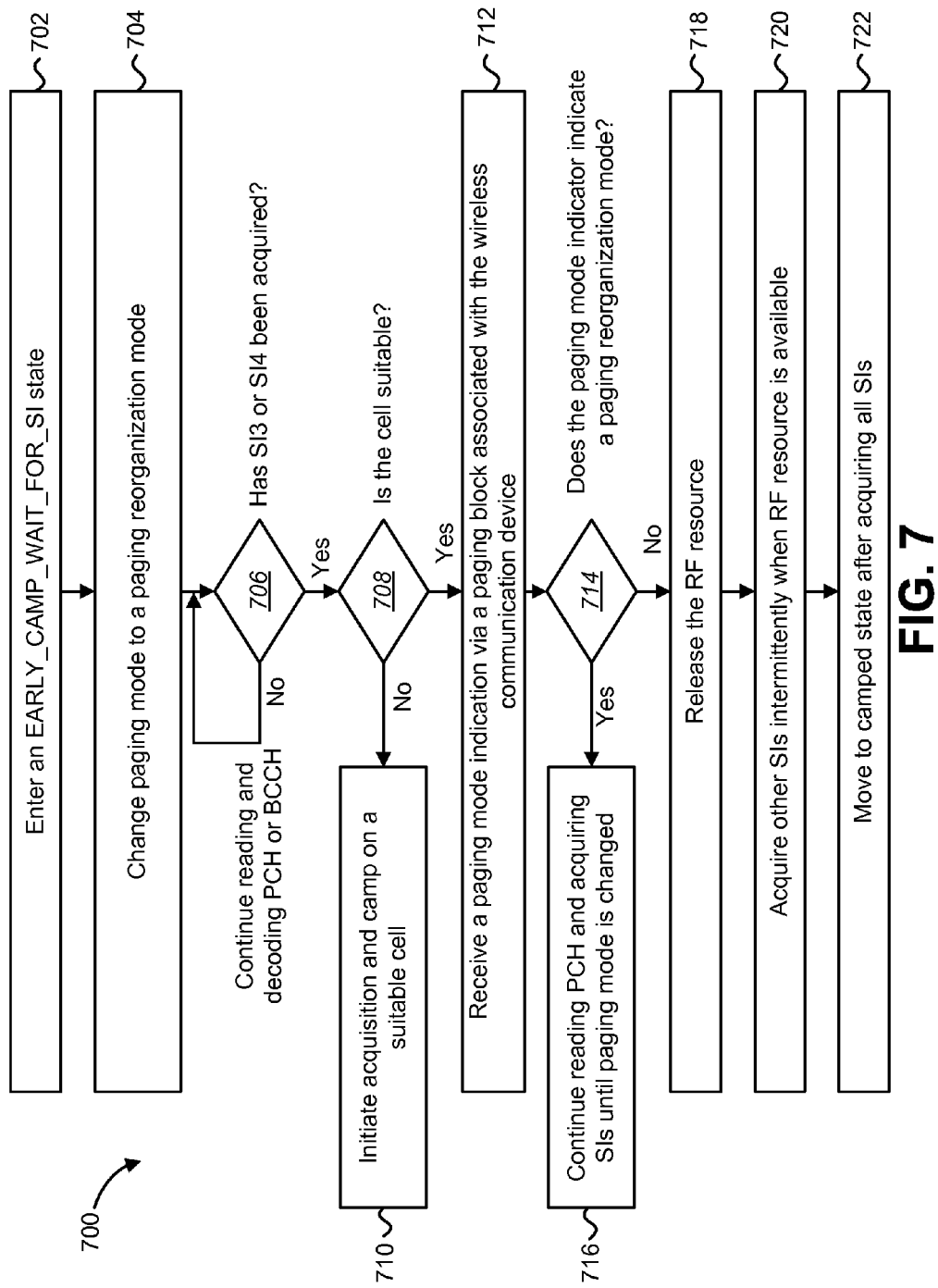
FIG. 7 is a flow diagram of a detailed method for obtaining system information according to some embodiments of the present invention.

FIG. 7 is a flow diagram of a detailed method 700 for obtaining system information 430 according to some embodiments of the present invention. The method 700 may be performed by a subscription 114 that is supported by the wireless communication device 104. For example, the first subscription 114*a* may enter 702 an early_camp_wait_for_si state. In some configurations, the first subscription 114*a* may enter 702 the early_camp_wait_for_si state after a cell re-selection. In other configurations, the first subscription 114*a* may enter 702 the early_camp_wait_for_si state after completing a voice call.

The first subscription 114*a* may then change 704 its paging mode to a paging reorganization mode. For example, the first subscription 114*a* may change its configuration such that it may read and decode all paging blocks 328 and exclusively use the RF resource. After changing 704 to a paging reorganization mode, the first subscription 114*a* may start reading and decoding at least one of the paging channel 326 and the broadcast channel.

While reading and decoding the paging channel 326 (or broadcast channel), the first subscription 114*a* may determine 706 if SI 3 432*c* or SI 4 432*d* has been acquired. If the first subscription 114*a* determines 706 that neither SI 3 432*c* nor SI 4 432*d* has been acquired, the first subscription 114*a* may continue reading and decoding the paging channel 326 (or broadcast channel) until at least one of SI 3 432*c* or SI 4 432*d* has been acquired.

If the first subscription 114*a* determines 706 that at least one of SI 3 432*c* and SI 4 432*d* has been acquired, the first subscription 114*a* may determine 708 if the cell is suitable.

For example, the first subscription 114a may determine whether the cell may provide a signal strong enough to satisfactorily transmit data between a base station 102 and the wireless communication device 504. If the first subscription 114a determines 708 that the cell is not suitable, the first subscription 114a may initiate 710 acquisition and camp on a suitable cell.

If the first subscription 114a determines 708 that the cell is suitable, the first subscription 114a may receive 712 a paging mode indication via a paging block 328 associated with the wireless communication device 504. This may be performed as described in connection with FIG. 6.

The first subscription 114a may then determine 714 if the paging mode indicator indicates a paging reorganization mode. If the paging mode indicator does indicate a paging reorganization mode, the first subscription 114a may remain in a paging reorganization mode and continue 716 reading the paging channel 326 (or the broadcast channel) and acquiring all the system information 430 until the paging mode is changed. In other words, the first subscription 114a may continue reading all paging blocks 328 irrespective of its paging group and may continue exclusively using the RF resource to do so.

If the first subscription 114a determines 714 that the paging mode indicator does not indicate a paging reorganization mode, the first subscription 114a may change its paging mode and release 718 the RF resource. This may be performed as described in connection with FIG. 2.

After releasing 718 the RF resource, the first subscription 114a may acquire 720 other system information intermittently when the RF resource is available. For example, the first subscription 114a may acquire 720 other system information from the first base station 102a in periods when the second subscription 114b is not utilizing the RF resource.

After all system information has been acquired, the first subscription 114a may move 722 to a camped state. In other words, the first subscription 114a my implement one or more configuration changes and begin transmitting voice/data communications with the base station 102.

Figure 8:
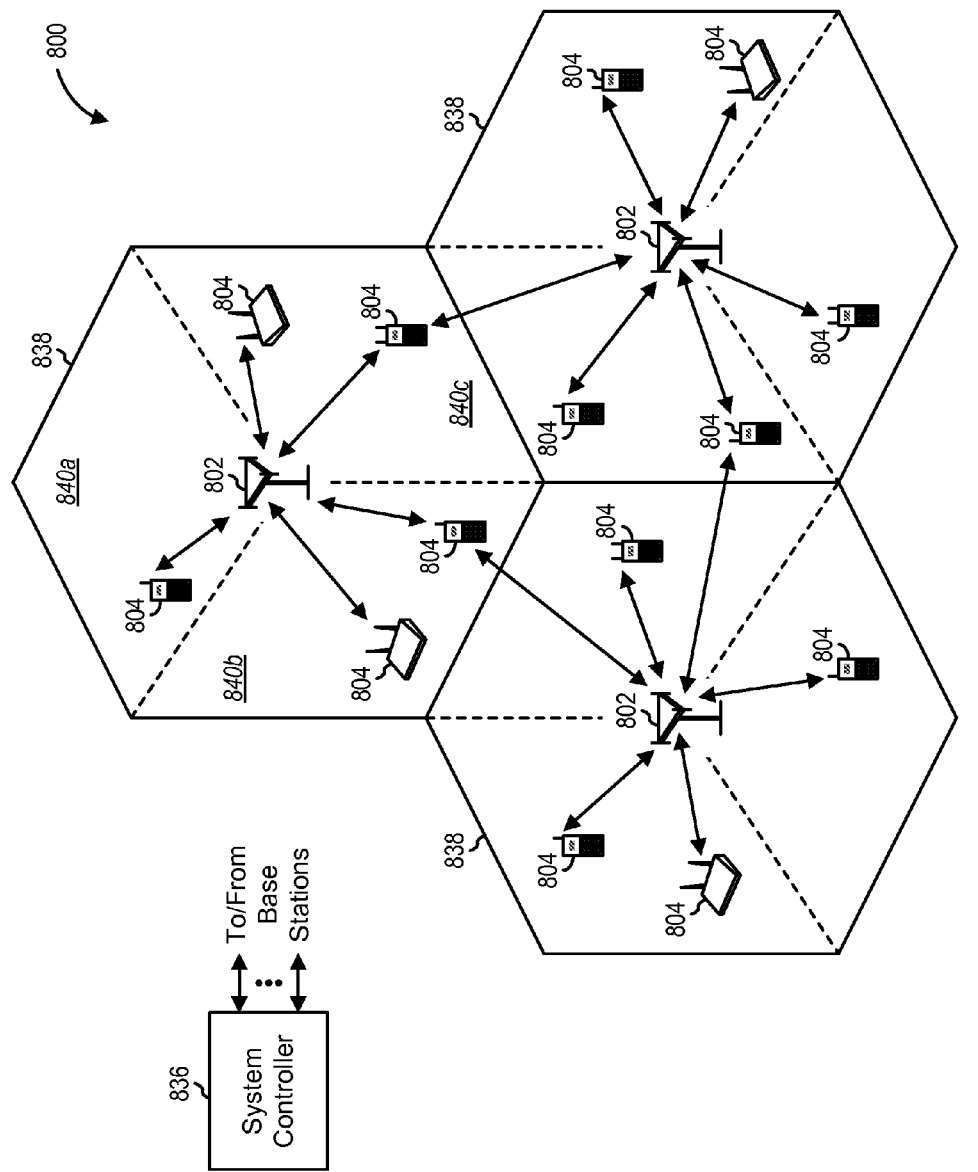
FIG. 8 shows another example of a wireless communication system in which the systems and methods disclosed herein may be utilized.

FIG. 8 shows another example of a wireless communication system 800 in which the systems and methods disclosed herein may be utilized. The wireless communication system 800 may include multiple base stations 802 and multiple wireless communication devices 804. Each base station 802 may provide communication coverage for a particular geographic area 838. The term "cell" can refer to a base station 802 and/or its coverage area 838, depending on the context in which the term is used.

To improve system capacity, a base station coverage area 838 may be partitioned into plural smaller areas, e.g., three smaller areas 840a, 840b, and 840c. Each smaller area 840a, 840b, 840c may be served by a respective base transceiver station (BTS). The term "sector" can refer to a BTS and/or its coverage area 840, depending on the context in which the term is used. For a sectorized cell, the BTSs for all sectors of that cell are typically co-located within the base station 802 for the cell.

Wireless communication devices 804 are typically dispersed throughout the wireless communication system 800. A wireless communication device 804 may communicate with one or more base stations 802 on the downlink and/or uplink at any given moment. The downlink (or forward link) refers to the communication link from a base station 802 to a wireless communication device 804, and the uplink (or reverse link) refers to the communication link from a wireless communication device 804 to a base station 802. Uplink and downlink may refer to the communication link or to the carriers used for the communication link.

For a centralized architecture, a system controller 836 may couple to the base stations 802 and provide coordination and control for the base stations 802. The system controller 836 may be a single network entity or a collection of network entities. For a distributed architecture, base stations 802 may communicate with one another as needed.

Figure 9:
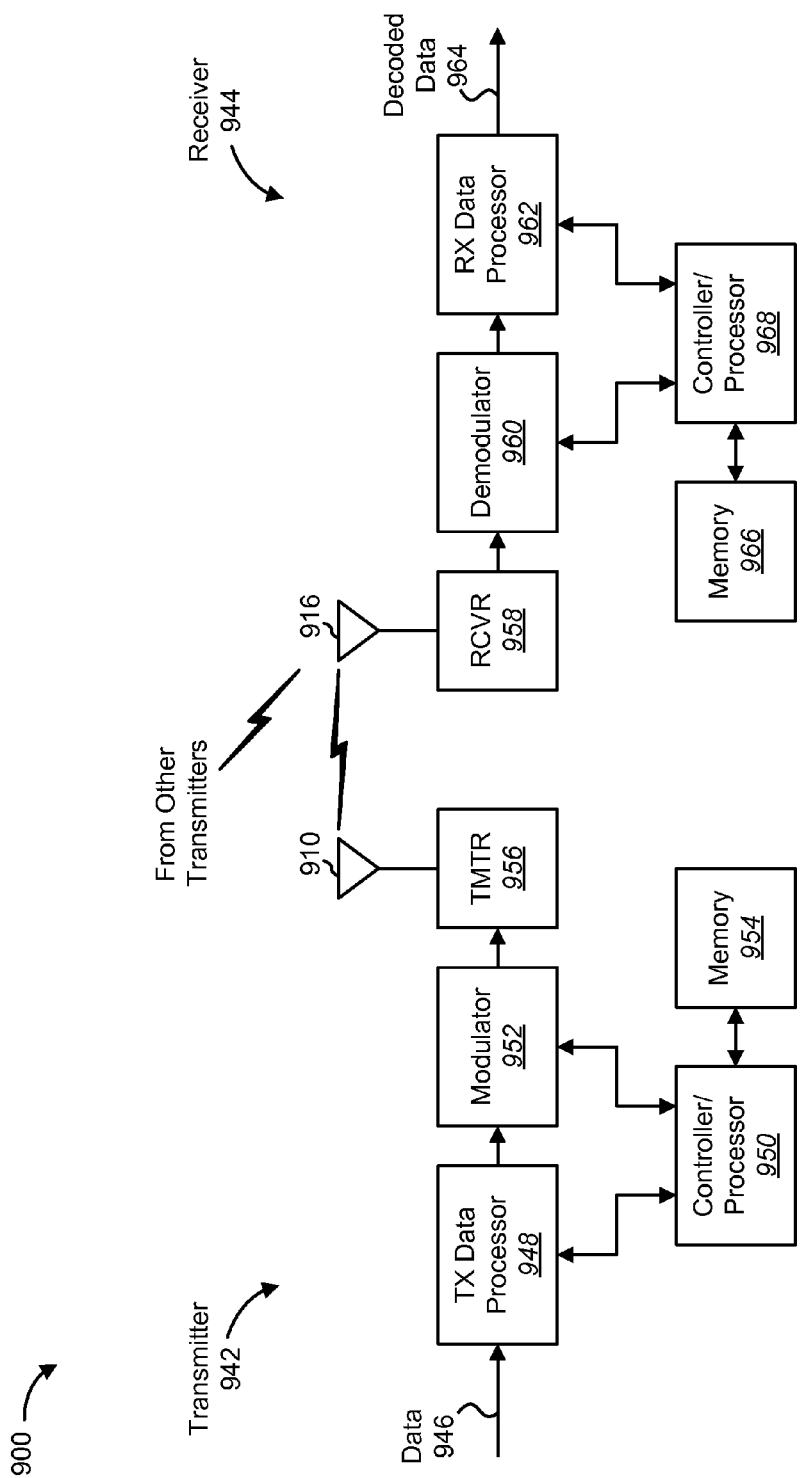
FIG. 9 shows a block diagram of a transmitter and a receiver in a wireless communication system.

FIG. 9 shows a block diagram of a transmitter 942 and a receiver 944 in a wireless communication system 900. For the downlink, the transmitter 942 may be part of a base station 902 and the receiver 944 may be part of a wireless communication device 904. For the uplink, the transmitter 942 may be part of a wireless communication device 904 and the receiver 944 may be part of a base station 902.

At the transmitter 942, a transmit (TX) data processor 948 receives and processes (e.g., formats, encodes, and interleaves) data 946 and provides coded data. A modulator 952 performs modulation on the coded data and provides a modulated signal. The modulator 952 may perform Gaussian minimum shift keying (GMSK) for GSM, 8-ary phase shift keying (8-PSK) for Enhanced Data rates for Global Evolution (EDGE), etc. GMSK is a continuous phase modulation protocol, whereas 8-PSK is a digital modulation protocol. A transmitter unit (TMTR) 956 conditions (e.g., filters, amplifies, and upconverts) the modulated signal and generates an RF-modulated signal, which is transmitted via an antenna 910.

At the receiver 944, an antenna 916 receives RF-modulated signals from the transmitter 942 and other transmitters. The antenna 916 provides a received RF signal to a receiver unit (RCVR) 958. The receiver unit 958 conditions (e.g., filters, amplifies, and downconverts) the received RF signal, digitizes the conditioned signal, and provides samples. A demodulator 960 processes the samples as described below and provides demodulated data. A receive (RX) data processor 962 processes (e.g., deinterleaves and decodes) the demodulated data and provides decoded data 964. In general, the processing by demodulator 960 and RX data processor 962 is complementary to the processing by the modulator 952 and the TX data processor 948, respectively, at the transmitter 942.

Controllers/processors 950 and 968 direct operation at the transmitter 942 and receiver 944, respectively. Memories 954 and 966 store program codes in the form of computer software and data used by the transmitter 942 and receiver 944, respectively.

Figure 10:
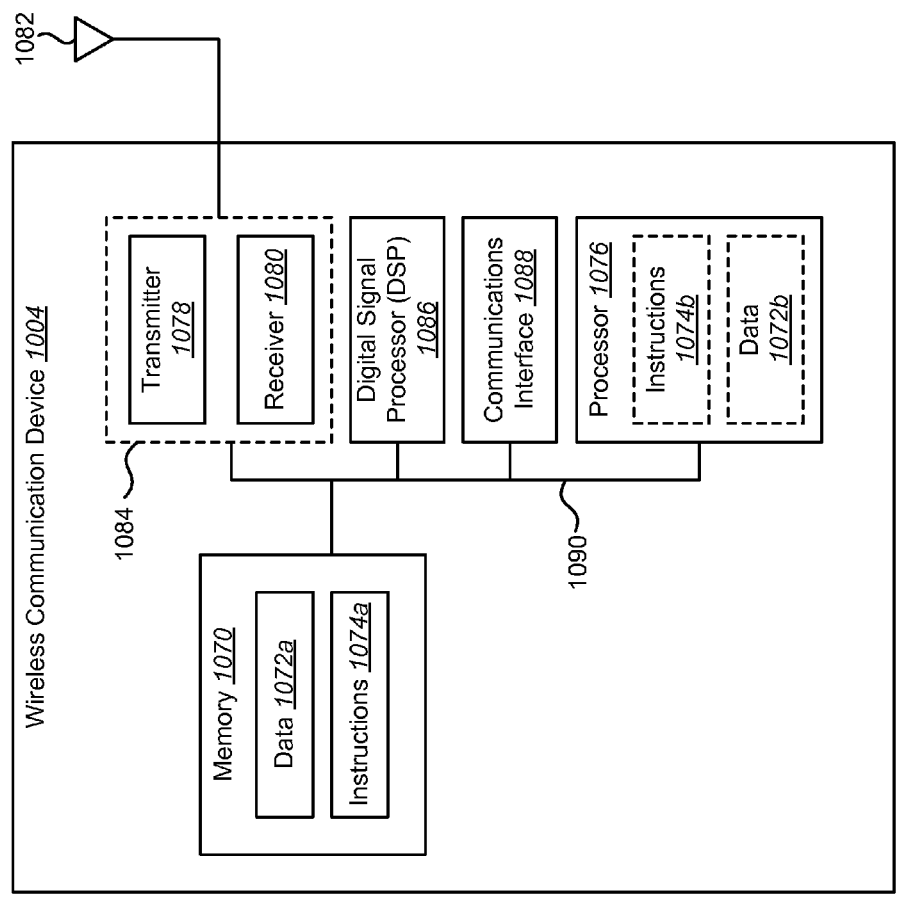
FIG. 10 illustrates certain components that may be included within a wireless communication device according to some embodiments of the present invention.

FIG. 10 illustrates certain components that may be included within a wireless communication device 1004 according to some embodiments of the present invention. The wireless communication device 1004 may be an access terminal, a mobile station, a user equipment (UE), etc. The wireless communication device 1004 includes a processor 1076. The processor 1076 may be a general purpose single- or multi-chip microprocessor (e.g., an ARM), a special purpose microprocessor (e.g., a digital signal processor (DSP)), a microcontroller, a programmable gate array, etc. The processor 1076 may be referred to as a central processing unit (CPU). Although just a single processor 1076 is shown in the wireless communication device 1004 of FIG. 10, in an alternative configuration, a combination of processors (e.g., an ARM and DSP) could be used.

The wireless communication device 1004 also includes memory 1070. The memory 1070 may be any electronic component capable of storing electronic information. The memory 1070 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1072a and instructions 1074a may be stored in the memory 1070. The instructions 1074a may be executable by the processor 1076 to implement the methods disclosed herein. Executing the instructions 1074a may involve the use of the data 1072a that is stored in the memory 1070. When the processor 1076 executes the instructions 1074, various portions of the instructions 1074b may be loaded onto the processor 1076, and various pieces of data 1072b may be loaded onto the processor 1076.

The wireless communication device 1004 may also include a transmitter 1078 and a receiver 1080 to allow transmission and reception of signals to and from the wireless communication device 1004 via an antenna 1082. The transmitter 1078 and receiver 1080 may be collectively referred to as a transceiver 1084. The wireless communication device 1004 may also include (not shown) multiple transmitters, multiple antennas, multiple receivers, and/or multiple transceivers.

The wireless communication device 1004 may include a digital signal processor (DSP) 1086. The wireless communication device 1004 may also include a communications interface 1088. The communications interface 1088 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 10 as a bus system 1090.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The techniques described herein may be used for various communication systems, including communication systems that employ global system for mobile communications (GSM). GSM is a widespread standard in cellular, wireless communication. GSM is relatively efficient for standard voice services. However, high-fidelity audio and data services require higher data throughput rates than that for which GSM is optimized. To increase capacity, the general packet radio service (GPRS), enhanced data rates for GSM evolution (EDGE) and universal mobile telecommunications system (UMTS) standards have been adopted in GSM systems. In the GSM/EDGE Radio Access Network (GERAN) specification, GPRS and EGPRS provide data services. The standards for GERAN are maintained by the 3GPP (third generation partnership project). GERAN is a part of GSM. More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data to and from the public switched telephone network (PSTN) and internet to and from remote terminals. GERAN is also a part of combined UMTS/GSM networks.

GSM employs a combination of Time Division Multiple Access (TDMA) and frequency division multiple access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (mobile station to base transceiver station). For downlink communication, GSM 900 uses 935-960 MHz bands (base station to wireless communication device). Furthermore, each frequency band is divided into 200 kHz carrier frequencies providing 124 radio frequency (RF) channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800.

Furthermore, each base station may be assigned one or more carrier frequencies. Each carrier frequency is divided into eight time slots using TDMA such that eight consecutive time slots form one TDMA frame with a duration of 4.615 milliseconds (ms). A physical channel occupies one time slot within a TDMA frame. Each active wireless communication device or user is assigned one or more time slot indices for the duration of a call. User-specific data for each wireless communication device is sent in the time slot(s) assigned to that wireless communication device and in TDMA frames used for the traffic channels.

The techniques described herein may also be used for various communication systems, including communication systems that are based on an orthogonal multiplexing scheme. Examples of such communication systems include orthogonal frequency division multiple access (OFDMA) systems, single-carrier frequency division multiple access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 6 and 7, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

We claim:

1. A method for obtaining system information for a wireless communication device, comprising:
    entering a paging reorganization mode after at least one of cell reselection and ending a voice call;
    acquiring a portion of system information by a first subscription using a radio frequency (RF) resource;
    changing a paging mode of the wireless communication device; and
    releasing the RF resource after acquiring the portion of the system information and prior to acquiring all of the system information, wherein the wireless communication device includes multiple subscriptions, and wherein releasing the RF resource comprises releasing the RF resource for use by a second subscription.

2. The method of claim 1, wherein the first subscription exclusively uses the RF resource during the paging reorganization mode.

3. The method of claim 1, wherein the first subscription reads and decodes all paging blocks during the paging reorganization mode.

4. The method of claim 1, wherein the paging reorganization mode is a non-discontinuous reception (non-DRX) mode.

5. The method of claim 1, wherein the RF resource is a single RF resource available to the wireless communication device.

6. The method of claim 1, wherein the portion of system information includes system information type 3 (SI 3) or system information type 4 (SI 4).

7. The method of claim 1, wherein the portion of system information includes at least one of a cell selection parameter, a random access channel (RACH) parameter, a control channel parameter, a cell identifier, a location area identifier, paging block information and cell block information.

8. The method of claim 1, further comprising determining a paging group to which the wireless communication device belongs.

9. The method of claim 8, further comprising:
reading and decoding paging blocks that are associated with the wireless communication device's paging group; and
avoiding reading and decoding paging blocks that are not associated with the wireless communication device's paging group.

10. The method of claim 1, wherein changing the paging mode comprises:
receiving a paging mode indication via a paging block associated with the wireless communication device; and
changing the paging mode based on the paging mode indication.

11. The method of claim 10, wherein the paging mode indication is received via at least one of an immediate assignment message or a paging message.

12. The method of claim 1, further comprising acquiring other system information when the RF resource is available.

13. The method of claim 1, wherein the system information is acquired from at least one of a paging channel (PCH) and a broadcast control channel (BCCH).

14. An apparatus for obtaining system information for a wireless communication device, comprising:
a processor;
memory in electronic communication with the processor; and
instructions stored in the memory, the instructions being executable by the processor to:
enter a paging reorganization mode after at least one of cell reselection and ending a voice call;
acquire a portion of system information by a first subscription using a radio frequency (RF) resource;
change a paging mode of the wireless communication device; and
release the RF resource after acquiring the portion of the system information and prior to acquiring all of the system information, wherein the wireless communication device includes multiple subscriptions, and wherein the instructions executable to release the RF resource comprise instructions executable to release the RF resource for use by a second subscription.

15. The apparatus of claim 14, wherein the first subscription exclusively uses the RF resource during the paging reorganization mode.

16. The apparatus of claim 14, wherein the instructions are executable to read and decode all paging blocks during the paging reorganization mode.

17. The apparatus of claim 14, wherein the paging reorganization mode is a non-discontinuous reception (non-DRX) mode.

18. The apparatus of claim 14, wherein the RF resource is a single RF resource available to the wireless communication device.

19. The apparatus of claim 14, wherein the portion of system information includes system information type 3 (SI 3) or system information type 4 (SI 4).

20. The apparatus of claim 14, wherein the portion of system information includes at least one of a cell selection parameter, a random access channel (RACH) parameter, a control channel parameter, a cell identifier, a location area identifier, paging block information and cell block information.

21. The apparatus of claim 14, further comprising instructions executable to determine a paging group to which the wireless communication device belongs.

22. The apparatus of claim 14, further comprising instructions executable to:
read and decode paging blocks that are associated with the wireless communication device's paging group; and
avoid reading and decoding paging blocks that are not associated with the wireless communication device's paging group.

23. The apparatus of claim 14, wherein the instructions executable to change the paging mode comprise instructions executable to:
receive a paging mode indication via a paging block associated with the wireless communication device; and
change the paging mode based on the paging mode indication.

24. The apparatus of claim 23, wherein the paging mode indication is received via at least one of an immediate assignment message or a paging message.

25. The apparatus of claim 14, further comprising instructions executable to acquire other system information when the RF resource is available.

26. The apparatus of claim 14, wherein the system information is acquired from at least one of a paging channel (PCH) and a broadcast control channel (BCCH).

27. A computer-program product for obtaining system information for a wireless communication device, the computer-program product comprising a non-transitory computer-readable medium having instructions thereon, the instructions comprising:
code for causing a first subscription to enter a paging reorganization mode after at least one of cell reselection and ending a voice call;
code for causing the first subscription to acquire a portion of system information by a first subscription using a radio frequency (RF) resource;
code for causing the first subscription to change a paging mode of the wireless communication device; and
code for causing the first subscription to release the RF resource after acquiring the portion of the system information and prior to acquiring all of the system information, wherein the wireless communication device includes multiple subscriptions, and wherein the code for causing the first subscription to release the RF resource comprises code for causing the first subscription to release the RF resource for use by a second subscription.

28. The computer-program product of claim 27, wherein the first subscription exclusively uses the RF resource during the paging reorganization mode.

29. The computer-program product of claim 27, wherein the instructions further comprise code for causing the first subscription to read and decode all paging blocks during the paging reorganization mode.

30. The computer-program product of claim 27, wherein the portion of system information includes at least one of system information type 3 (SI 3) and system information type 4 (SI 4).

31. The computer-program product of claim 27, further comprising code for causing the first subscription to determine a paging group to which the wireless communication device belongs.

32. The computer-program product of claim 31, further comprising:
code for causing the first subscription to read and decode paging blocks that are associated with the wireless communication device's paging group; and code for causing the first subscription to avoid reading and decoding paging blocks that are not associated with the wireless communication device's paging group.

33. An apparatus for obtaining system information for a wireless communication device, comprising:
   means for entering a paging reorganization mode after at least one of cell reselection and ending a voice call;
   means for acquiring a portion of system information by a first subscription using a radio frequency (RF) resource;
   means for changing a paging mode of the wireless communication device; and
   means for releasing the RF resource after acquiring the portion of the system information and prior to acquiring all of the system information, wherein the wireless communication device includes multiple subscriptions, and wherein the means for releasing the RF resource comprises means for releasing the RF resource for use by a second subscription.

34. The apparatus of claim 33, wherein the first subscription exclusively uses the RF resource during the paging reorganization mode.

35. The apparatus of claim 33, further comprising means for reading and decoding all paging blocks during the paging reorganization mode.

36. The apparatus of claim 33, wherein the portion of system information includes at least one of system information type 3 (SI 3) and system information type 4 (SI 4).

37. The apparatus of claim 33, further comprising means for determining a paging group to which the wireless communication device belongs.

38. The apparatus of claim 37, further comprising:
   means for reading and decoding paging blocks that are associated with the wireless communication device's paging group; and
   means for avoiding reading and decoding paging blocks that are not associated with the wireless communication device's paging group.

39. The apparatus of claim 33, wherein the means for changing the paging mode comprises:
   means for receiving a paging mode indication via a paging block associated with the wireless communication device; and
   means for changing the paging mode based on the paging mode indication.

40. The apparatus of claim 33, further comprising means for acquiring other system information when the RF resource is available.

41. The method of claim 1, wherein the RF resource comprises a transmitter and a receiver.

* * * * *